US011810229B2

(12) United States Patent
Tanaka

(10) Patent No.: US 11,810,229 B2
(45) Date of Patent: Nov. 7, 2023

(54) GRAPH DISPLAY DEVICE HAVING DISPLAY CONTROL FUNCTION FOR CONVERTING TWO-DIMENSIONAL GRAPH TO THREE-DIMENSIONAL GRAPH AND DISPLAYING THREE-DIMENSIONAL GRAPH, AND CORRESPONDING GRAPH DISPLAY METHOD AND NONTRANSITORY COMPUTER READABLE RECORDING MEDIUM

(71) Applicant: CASIO COMPUTER CO., LTD., Tokyo (JP)

(72) Inventor: Hirokazu Tanaka, Fuchu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/673,984

(22) Filed: Feb. 17, 2022

(65) Prior Publication Data

US 2022/0309721 A1 Sep. 29, 2022

(30) Foreign Application Priority Data

Mar. 24, 2021 (JP) ................................. 2021-050508

(51) Int. Cl.
*G06T 11/20* (2006.01)
*G06T 11/00* (2006.01)
(52) U.S. Cl.
CPC .......... *G06T 11/206* (2013.01); *G06T 11/001* (2013.01); *G06T 2207/20092* (2013.01)

(58) Field of Classification Search
None
See application file for complete search history.

(56) References Cited

U.S. PATENT DOCUMENTS

| | | | |
|---|---|---|---|
| 9,805,484 B2 | 10/2017 | Endo et al. | |
| 2012/0116687 A1* | 5/2012 | Kanderian | G16B 20/00 702/20 |
| 2018/0204389 A1* | 7/2018 | Tanaka | G06F 17/17 |
| 2019/0317764 A1* | 10/2019 | Inoue | G06F 9/3004 |
| 2019/0317981 A1* | 10/2019 | Ono | G06F 3/04845 |
| 2019/0318516 A1* | 10/2019 | Tanaka | G06F 17/12 |

FOREIGN PATENT DOCUMENTS

| | | | |
|---|---|---|---|
| JP | H11213178 A | | 8/1999 |
| JP | 2000293704 A | | 10/2000 |
| JP | 2004206577 | * | 7/2004 |
| JP | 2004206577 A | | 7/2004 |

(Continued)

OTHER PUBLICATIONS

Stack Overflow, "3d plot with given 2d data", posted 2011, https://stackoverflow.com/questions/5909998/3d-plot-with-given-2d-data (Year: 2011).*

(Continued)

*Primary Examiner* — Sarah Le
(74) *Attorney, Agent, or Firm* — Holtz, Holtz & Volek PC

(57) ABSTRACT

A graph display device includes: a display unit; and at least one processor, wherein the at least one processor is configured to convert a mathematical formula including two variables into a three-dimensional graph formula and display the three-dimensional graph formula on the display unit as a first three-dimensional graph.

11 Claims, 10 Drawing Sheets

(56) References Cited

FOREIGN PATENT DOCUMENTS

| | | |
|---|---|---|
| JP | 2009157726 A | 7/2009 |
| JP | 2012098951 A | 5/2012 |
| JP | 2015125718 A | 7/2015 |

OTHER PUBLICATIONS

Ale Carnerio, "Multiple 3D plots using colors", posted 2010, http://usingscilab.blogspot.com/2010/04/multiple-3d-plots-using-colors.html (Year: 2010).*

Siobhan Roberts, "The Perfect Valentine? A Math Formula"; 2019, https://www.nytimes.com/2019/02/14/science/math-algorithm-valentine.h (Year: 2019).*

Japanese Office Action (and English language translation thereof) dated Sep. 13, 2022, issued in counterpart Japanese Application No. 2021-050508.

GeoGebra homepage, [online], [searched on Mar. 17, 2021], Internet <URL: https://www.geogebra.org>.

* cited by examiner

FIG. 6
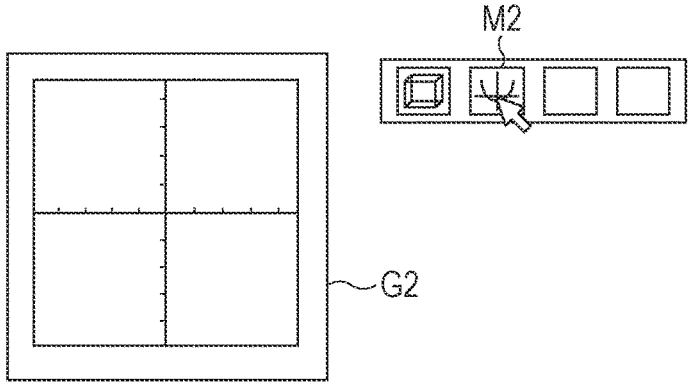
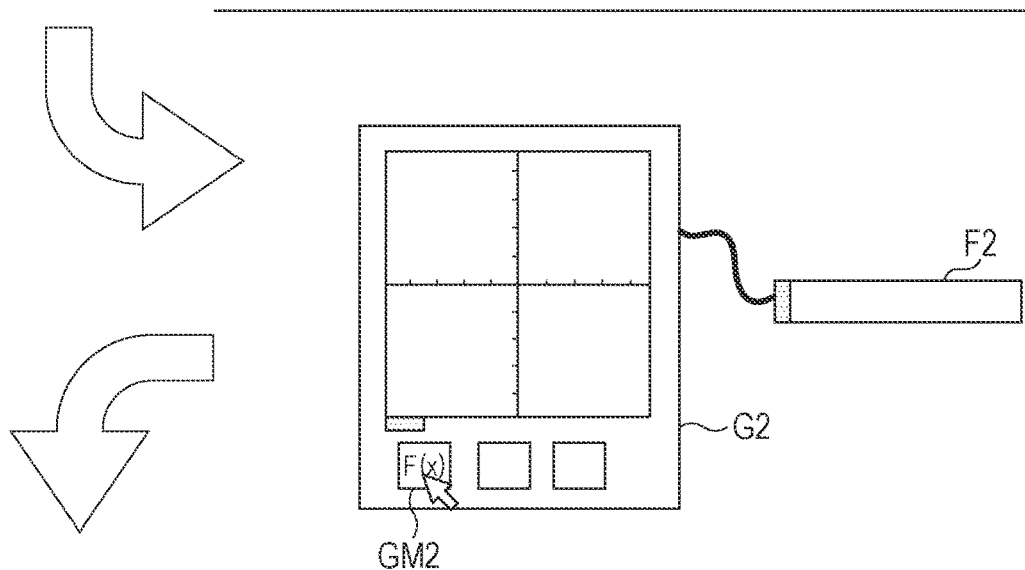
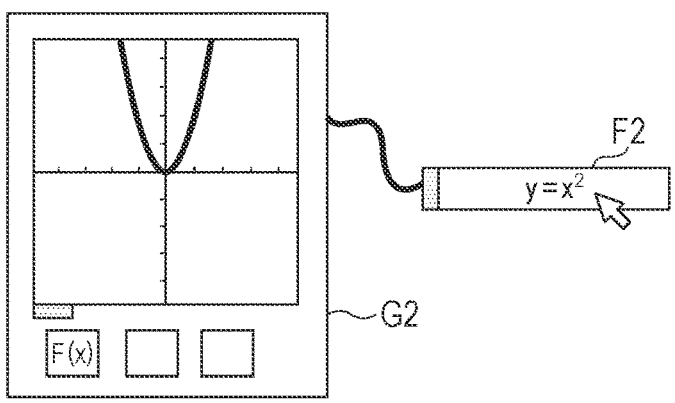

GRAPH DISPLAY DEVICE HAVING DISPLAY CONTROL FUNCTION FOR CONVERTING TWO-DIMENSIONAL GRAPH TO THREE-DIMENSIONAL GRAPH AND DISPLAYING THREE-DIMENSIONAL GRAPH, AND CORRESPONDING GRAPH DISPLAY METHOD AND NONTRANSITORY COMPUTER READABLE RECORDING MEDIUM

BACKGROUND

1. Technical Field

The present specification relates to a graph display device, a graph display method, and a non-transitory computer-readable recording medium storing a program.

2. Related Art

Conventionally, as an application that can be used on a web browser or an application that can be used by being downloaded or the like, an application having a function of displaying a graph corresponding to a mathematical formula input by a user and the like is disclosed in GeoGebra homepage, [online], [searched on Mar. 17, 2021], Internet <URL: https://www.geogebra.org>.

In such an application, it is difficult to display a two-dimensional graph together with a three-dimensional graph. In a case of performing such display, it necessary to manually convert a graph formula having a lower dimension into a graph formula having a higher dimension and input the converted graph formula.

SUMMARY

A graph display device includes: a display unit; and at least one processor, wherein the at least one processor is configured to convert a mathematical formula including two variables into a three-dimensional graph formula and display the three-dimensional graph formula on the display unit as a first three-dimensional graph.

A graph display method of a graph display device is provided with a display unit, and includes the step of converting a mathematical formula including two variables into a three-dimensional graph formula, and displaying the three-dimensional graph formula on the display unit as a first three-dimensional graph.

A non-transitory computer-readable recording medium stores a program executable by at least one processor of a graph display device provided with a display unit, the program causing the at least one processor to execute converting a mathematical formula including two variables into a three-dimensional graph formula, and displaying the three-dimensional graph formula on the display unit as a first three-dimensional graph.

BRIEF DESCRIPTION OF THE DRAWINGS

FIG. 6 is another diagram for describing the example of the procedure of creating the tags;

DETAILED DESCRIPTION

Figure 1:
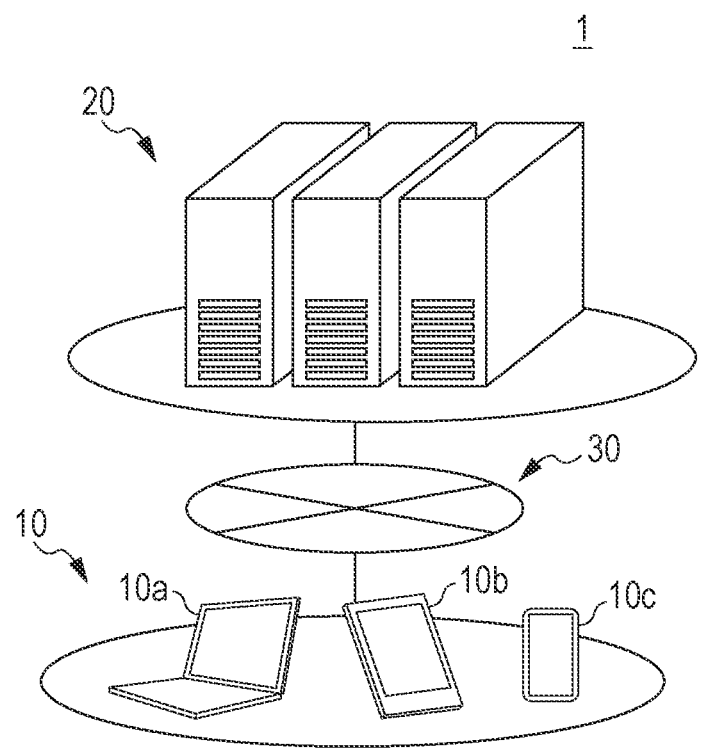
FIG. 1 is a diagram illustrating a configuration of a system.
Figure 2:
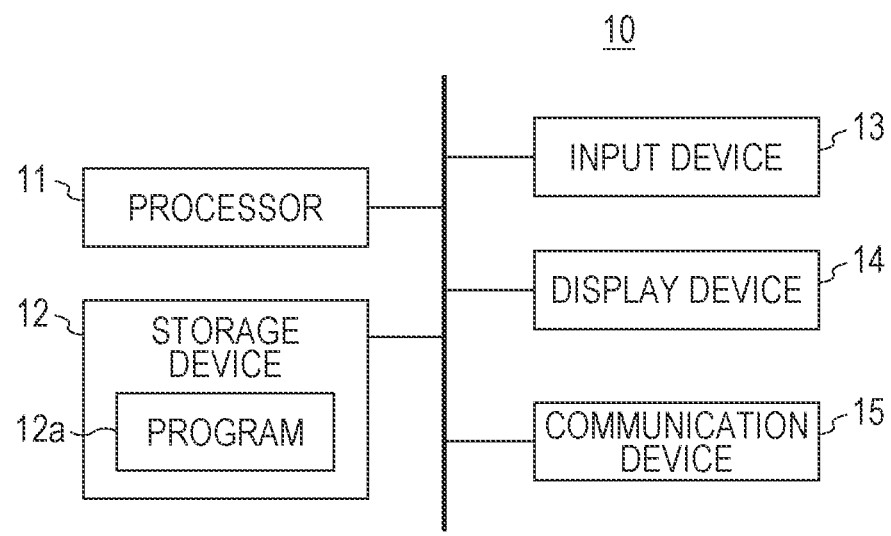
FIG. 2 is a block diagram illustrating a physical configuration of a client terminal.
Figure 3:
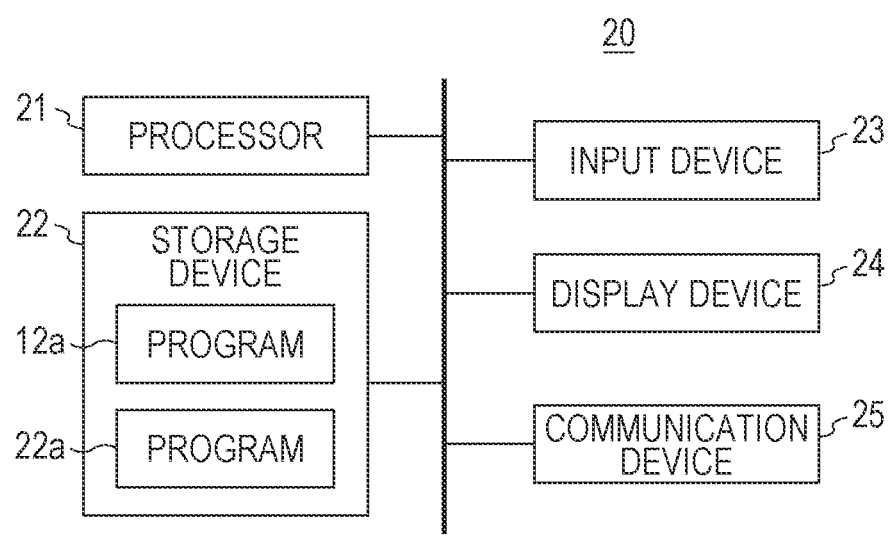
FIG. 3 is a block diagram illustrating a physical configuration of a server.

FIG. 1 is a diagram illustrating a configuration of a system 1. FIG. 2 is a block diagram illustrating a physical configuration of a client terminal 10. FIG. 3 is a block diagram illustrating a physical configuration of a server 20. The configuration of the system 1 will be described with reference to FIGS. 1 to 3.

The system 1 is, for example, a system that performs various mathematical operations according to an input from a user and displays operation results using a graph and the like although not particularly limited. As illustrated in FIG. 1, the system 1 includes a client terminal 10 and a server 20 which are connected via a network 30. The network 30 is, for example, the Internet, but may be another type of network such as a dedicated line. Hereinafter, a case where the system 1 is a web application system will be described as an example, but the system 1 may be a client server system.

The client terminal 10 is a terminal including a display device, and is operated by the user of the system 1. In the case where the system 1 is the web application system, a web browser may be installed in the client terminal 10. For example, the client terminal 10 transmits a request to the server 20 in response to an input of the user, and provides an application screen to the user based on a response from the server 20 with respect to the request. The client terminal 10 is an example of a graph display device.

As illustrated in FIG. 1, the client terminal 10 may be a notebook computer 10*a*, a tablet computer 10*b*, or a computer 10*c* that is a smartphone. In addition, the client terminal 10 may be, for example, a stationary computer.

For example, as illustrated in FIG. 2, the client terminal 10 includes a processor 11, a storage device 12, an input device 13, a display device 14, and a communication device 15.

The processor 11 is, for example, an electric circuit including a central processing unit (CPU) and the like, and executes a program 12*a* stored in the storage device 12. Note that the processor 11 may include other types of processors such as a graphics processing unit (GPU), an application specific integrated circuit (ASIC), a field-programmable gate array (FPGA), and a digital signal processor (DSP).

The storage device 12 is, for example, an arbitrary semiconductor memory, and includes a volatile memory such as a random access memory (RAM) and a nonvolatile memory such as a read only memory (ROM) and a flash memory. In addition, the storage device 12 may include a magnetic storage device, an optical storage device, and other types of storage devices. The storage device 12 stores a program 12a which is executed by the processor 11. Note that the program 12a stored in the storage device 12 may be downloaded from the server 20 via the network 30 and the communication device 15, for example.

The input device 13 includes, for example, a keyboard, a mouse, a touch panel, and the like, but may include a voice input device such as a microphone, or may include other types of input devices. The input device 13 is an example of an input unit that receives an operation of the user. The display device 14 is, for example, a liquid crystal display, an organic EL display, a plasma display, a CRT display, or the like, but may be another type of display device such as a matrix LED panel. The display device 14 is an example of a display unit. The communication device 15 may be, for example, a wireless communication device such as a Wi-Fi (registered trademark) module or may be a wired communication device.

The server 20 is a server device that processes the request from the client terminal 10 and transmits a processing result to the client terminal 10. The server 20 may be configured as a single device, or may be a set of a plurality of devices including a web server, an application server, a database server, and the like. In addition, the server 20 may be configured as a distributed computing system.

For example, as illustrated in FIG. 3, the server 20 includes a processor 21, a storage device 22, an input device 23, a display device 24, and a communication device 25.

The processor 21 is, for example, an electric circuit including a CPU and the like, and executes a program 22a stored in the storage device 22. Note that the processor 21 may include other types of processors such as a GPU, an ASIC, an FPGA, and a DSP.

The storage device 22 is, for example, an arbitrary semiconductor memory, and includes a volatile memory such as a RAM and a nonvolatile memory such as a ROM and a flash memory. In addition, the storage device 22 may include a magnetic storage device, an optical storage device, and other types of storage devices. The storage device 22 stores the program 22a which is executed by the processor 21. In addition, the storage device 22 may store the program 12a which is distributed to the client terminal 10 and executed by the client terminal 10. As a result, the client terminal 10 can execute the program 12a distributed from the server 20 to perform processing.

The input device 23 includes, for example, a keyboard, a mouse, a touch panel, and the like, but may include a voice input device such as a microphone, or may include other types of input devices. The display device 24 is, for example, a liquid crystal display, an organic EL display, a plasma display, a CRT display, or the like, but may be another type of display device such as a matrix LED panel. The communication device 25 may be a wireless communication device or a wired communication device.

In the system 1 configured as described above, when the user starts the web browser installed in the client terminal 10 and inputs a predetermined URL, the client terminal 10 can download the program 12a operating on the web browser provided by the server 20 to the storage device 12 and execute the program. In addition, it is also possible to access a web application specified by a URL. When the user performs various operations on the application screen displayed on the web browser, the client terminal 10 can transmit the request to the server 20, and can update the application screen based on the response from the server 20.

Figure 4:
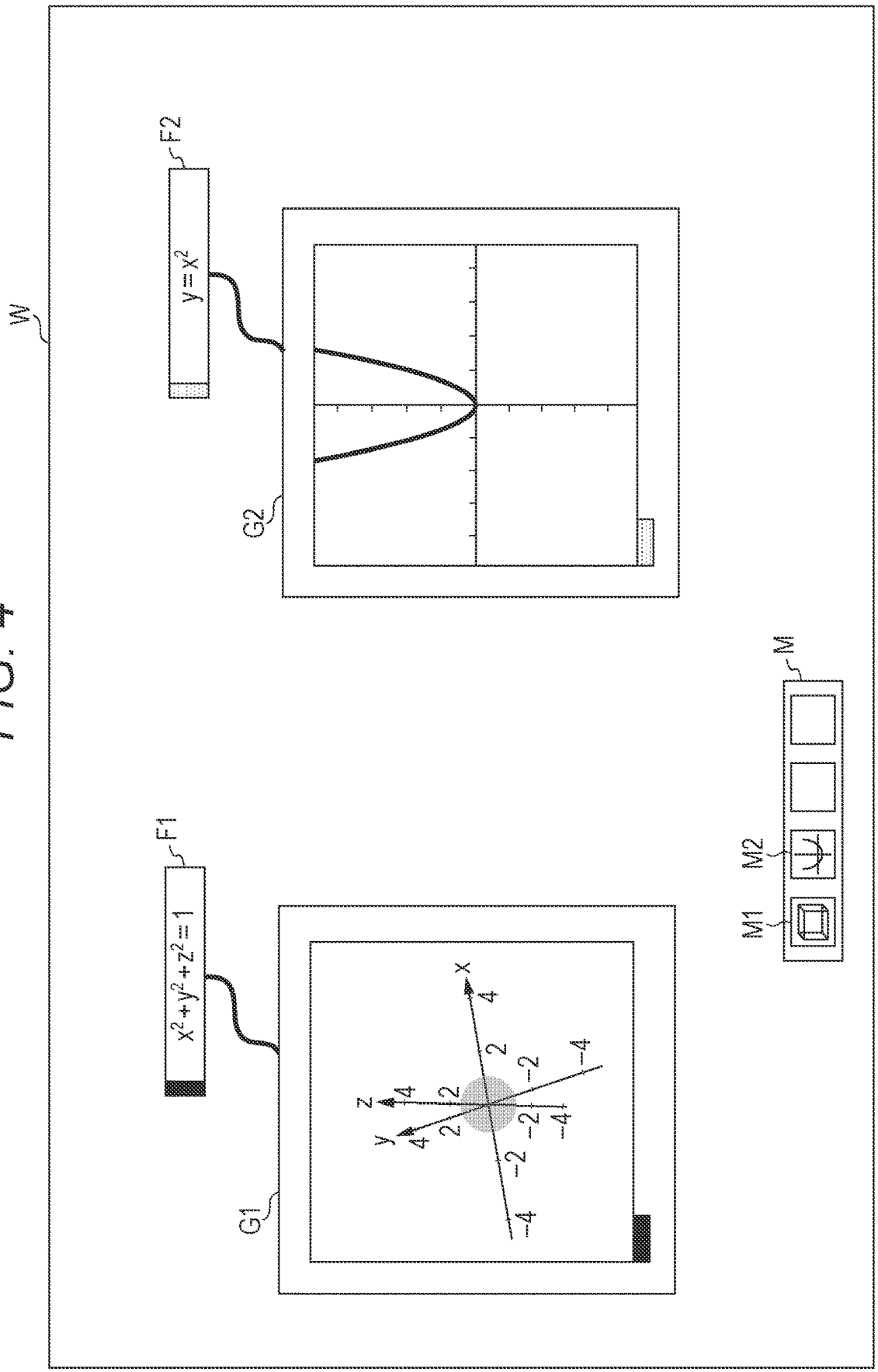
FIG. 4 is a diagram illustrating an application screen displayed on the client terminal.

FIG. 4 is a diagram illustrating the application screen displayed on the client terminal 10. The application screen displayed when the client terminal 10 accesses the server 20 will be described with reference to FIG. 4.

A window W illustrated in FIG. 4 is a window of the web browser. In the window W, the application screen in which a plurality of display areas (hereinafter, referred to as "tags") are arranged is displayed. There are a plurality of types of tags arranged on the application screen. FIG. 4 illustrates four types of tags, that is, a three-dimensional graph formula tag F1, a three-dimensional graph tag G1, a two-dimensional graph formula tag F2, and a two-dimensional graph tag G2. In principle, the three-dimensional graph formula tag F1 is a tag that displays a three-dimensional graph formula input by the user, and can also be referred to as a tag including the three-dimensional graph formula. The three-dimensional graph formula is a mathematical formula representing a three-dimensional graph, and is the mathematical formula including three variables. In the illustrated three-dimensional graph formula tag F1, one three-dimensional graph formula ($x2+y2+z2=1$) is displayed. The three-dimensional graph tag G1 is a tag that displays a three-dimensional graph, and can also be referred to as a tag including the three-dimensional graph. In the illustrated three-dimensional graph tag G1, one three-dimensional graph (three-dimensional graph corresponding to "$x2+y2+z2=1$") is displayed. In principle, the two-dimensional graph formula tag F2 is a tag that displays a two-dimensional graph formula input by the user, and can also be referred to as a tag including the two-dimensional graph formula. The two-dimensional graph formula is a mathematical formula representing a two-dimensional graph, and is the mathematical formula including two variables. In the illustrated two-dimensional graph formula tag F2, one two-dimensional graph formula ($y=x2$) is displayed. The two-dimensional graph tag G2 is a tag that displays a two-dimensional graph, and can also be referred to as a tag including the two-dimensional graph. In the illustrated two-dimensional graph tag G2, one two-dimensional graph (two-dimensional graph corresponding to "$y=x2$") is displayed.

Note that a menu list M displayed in FIG. 4 includes menus (menus M1 and M2) corresponding to the above-described three-dimensional graph tag and two-dimensional graph tag, respectively. The menu list M is displayed, for example, by clicking (or pressing) an area where no tag exists on the application screen. Note that the menu M1 is a menu for adding the three-dimensional graph tag. The menu M2 is a menu for adding the two-dimensional graph tag.

Figure 5:
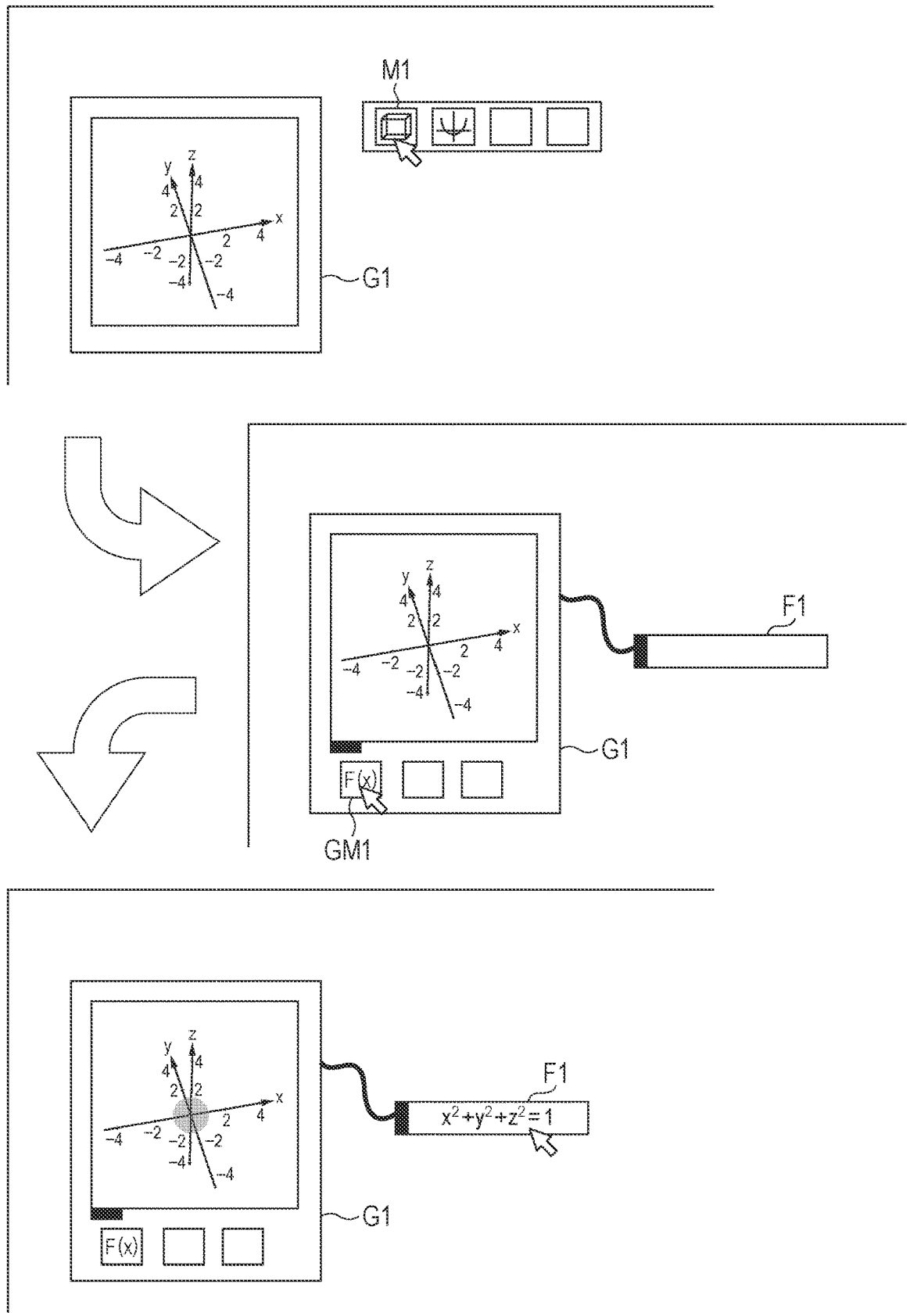
FIG. 5 is a diagram for describing an example of a procedure of creating tags.

FIGS. 5 and 6 are diagrams for describing an example of a procedure of creating tags. A procedure of creating the plurality of tags displayed on the window W illustrated in FIG. 4 on the application screen will be described with reference to FIGS. 5 and 6.

First, when the user clicks an arbitrary area on the application screen in a state where no tag is displayed on the application screen, the menu list M is displayed. Thereafter, when the user clicks the menu M1 on the menu list M, the three-dimensional graph tag G1 is created and displayed on the application screen as illustrated in the upper part of FIG. 5. At this time, a graph is not displayed on the three-dimensional graph tag G1, and only the scale of the graph is displayed.

When the user clicks the three-dimensional graph tag G1, a plurality of menus are displayed on the three-dimensional graph tag G1. When the user further clicks a menu GM1 arranged on the left side, the three-dimensional graph formula tag F1 is created and displayed on the application screen in association with the three-dimensional graph tag G1 as illustrated in the middle part of FIG. 5. Note that the association between tags is expressed by displaying a line connecting the related tags.

Next, when the user inputs the three-dimensional graph formula (x2+y2+z2=1) to the three-dimensional graph formula tag F1, the three-dimensional graph corresponding to the three-dimensional graph formula input to the three-dimensional graph formula tag F1 is displayed on the three-dimensional graph tag G1 as illustrated in the lower part of FIG. 5.

Subsequently, when the user clicks an arbitrary area where no tag exists on the application screen, the menu list M is displayed. Thereafter, when the user clicks the menu M2 on the menu list M, the two-dimensional graph tag G2 is created and displayed on the application screen as illustrated in the upper part of FIG. 6. At this time, a graph is not displayed on the two-dimensional graph tag G2, and only the scale of the graph is displayed.

When the user clicks the two-dimensional graph tag G2, a plurality of menus are displayed on the two-dimensional graph tag G2. When the user further clicks a menu GM2 arranged on the left side, the two-dimensional graph formula tag F2 is created and displayed on the application screen in association with the two-dimensional graph tag G2 as illustrated in the middle part of FIG. 6.

Next, when the user inputs the two-dimensional graph formula (y=x2) to the two-dimensional graph formula tag F2, the two-dimensional graph corresponding to the two-dimensional graph formula input to the two-dimensional graph formula tag F2 is displayed on the two-dimensional graph tag G2 as illustrated in the lower part of FIG. 6.

As the above operations are performed, the application screen displayed on the window W illustrated in FIG. 4 is displayed. Note that a plurality of three-dimensional graphs can be displayed in the three-dimensional graph tag G1 by repeating the pressing of the menu GM1 and the input of the three-dimensional graph formula to the three-dimensional graph formula tag F1 described in FIG. 5. In this case, the plurality of input three-dimensional graph formulas are displayed in the three-dimensional graph formula tag F1, and the plurality of three-dimensional graphs corresponding to the plurality of three-dimensional graph formulas are displayed in the three-dimensional graph tag G1. Similarly, a plurality of two-dimensional graphs can be displayed in the two-dimensional graph tag G2 by repeating the pressing of the menu GM2 and the input of the two-dimensional graph formula to the two-dimensional graph formula tag F2 described in FIG. 6. In this case, the plurality of input two-dimensional graph formulas are displayed in the two-dimensional graph formula tag F2, and the plurality of two-dimensional graphs corresponding to the plurality of two-dimensional graph formulas are displayed in the two-dimensional graph tag G2. The tags having different dimensions displayed on the application screen in this manner can be coupled by the user's operation.

Figure 7:
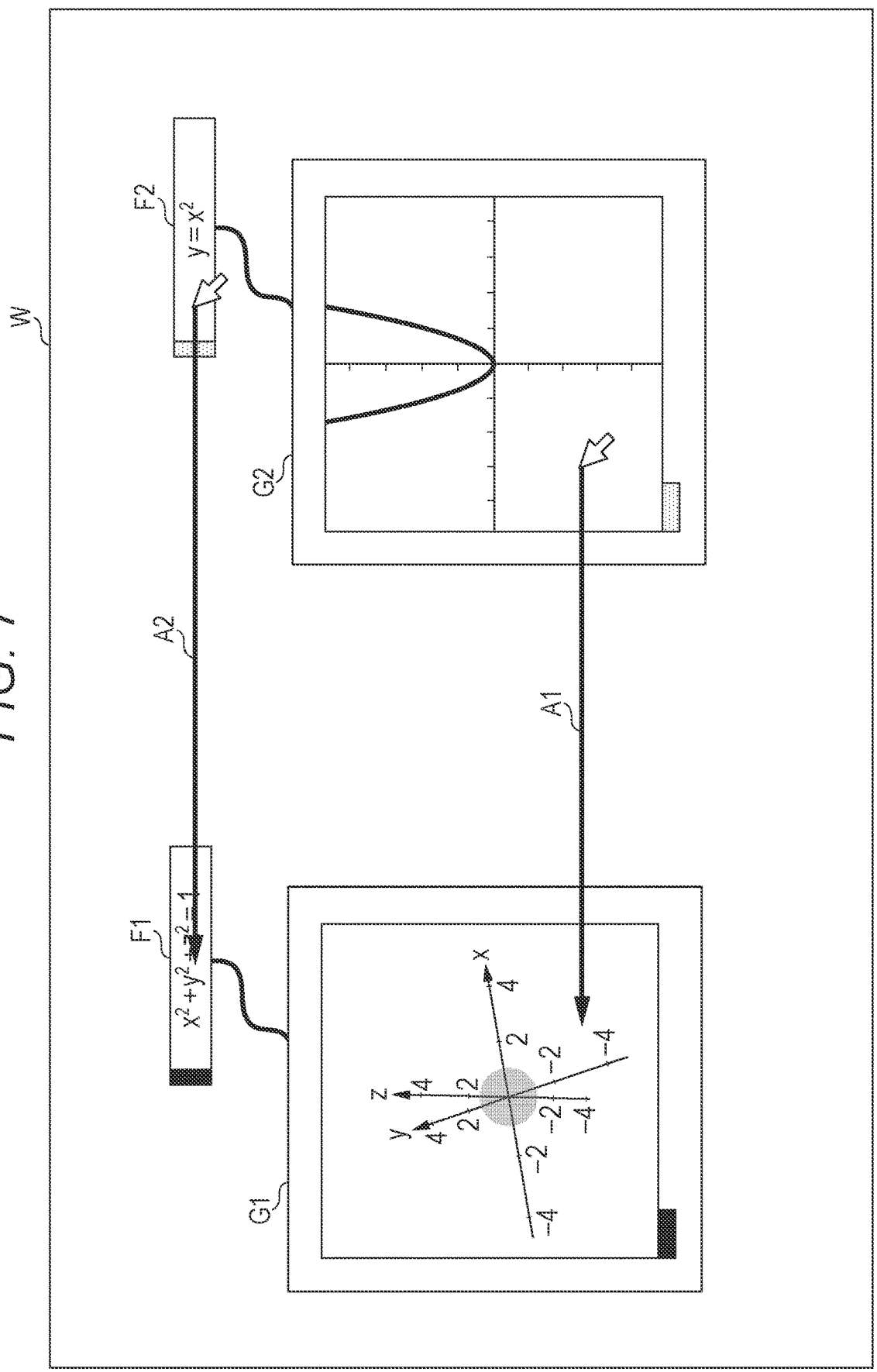
FIG. 7 is a diagram for describing an example of a procedure of coupling tags having different dimensions.
Figure 8:
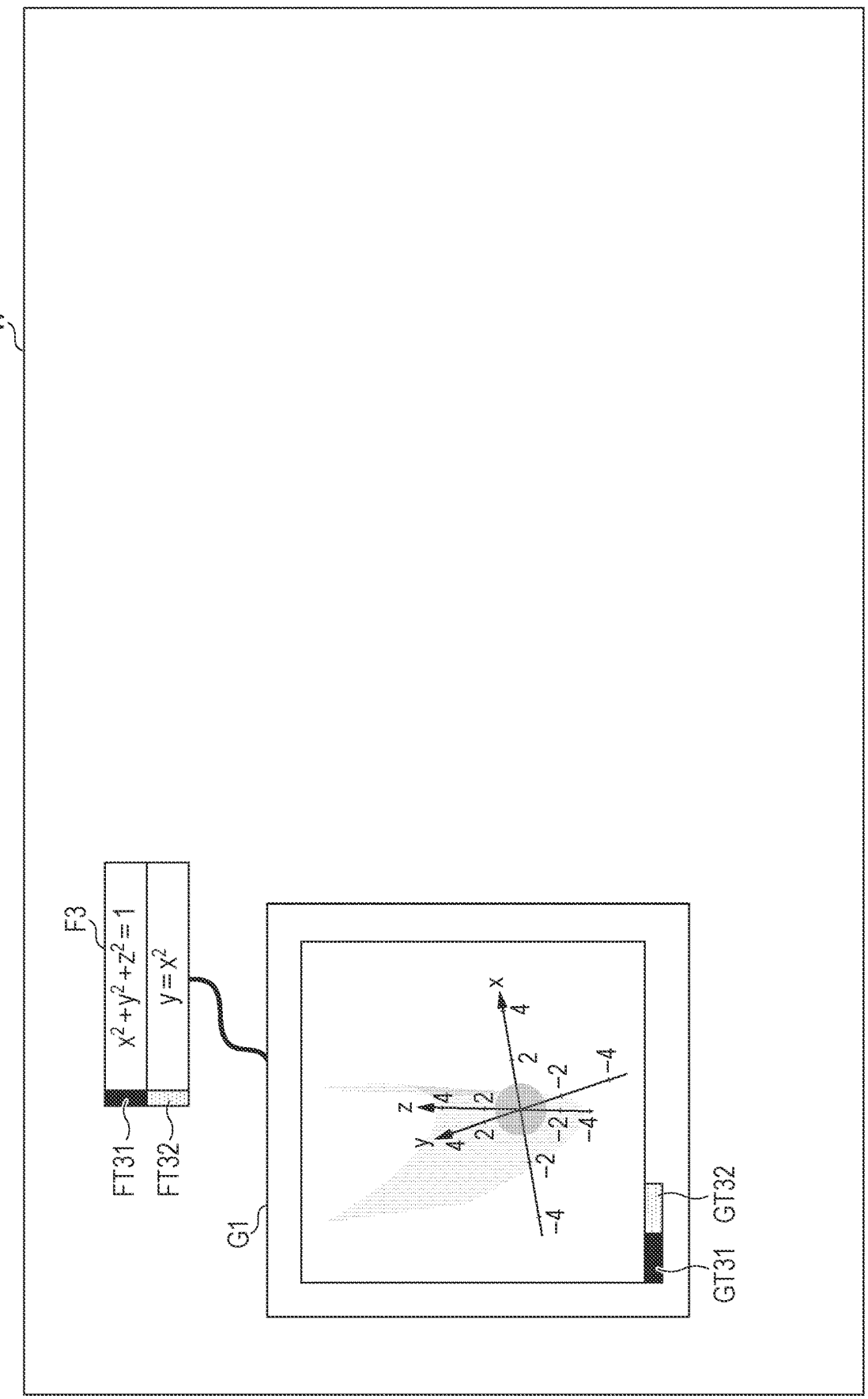
FIG. 8 is another diagram for describing the example of the procedure of coupling the tags having different dimensions.

FIGS. 7 and 8 are diagrams for describing an example of a procedure of coupling tags having different dimensions. The example of the procedure of coupling the tags having different dimensions displayed on the application screen of the window W illustrated in FIG. 4 will be described with reference to FIGS. 7 and 8.

When the user performs an operation of moving the two-dimensional graph tag G2 as indicated by an arrow A1 in FIG. 7 such that the two-dimensional graph tag G2 is partially or entirely superimposed on the three-dimensional graph tag G1 or performs an operation of moving the two-dimensional graph formula tag F2 as indicated by an arrow A2 in FIG. 7 such that the two-dimensional graph formula tag F2 is partially or entirely superimposed on the three-dimensional graph formula tag F1 in a state where the three-dimensional graph tag G1, the three-dimensional graph formula tag F1, the two-dimensional graph tag G2, and the two-dimensional graph formula tag F2 are displayed on the application screen, a three-dimensional graph tag G3 in which the three-dimensional graph (three-dimensional graph corresponding to "x2+y2+z2=1"), which has been displayed in the three-dimensional graph tag G1, and a three-dimensional graph (three-dimensional graph corresponding to "y=x2") corresponding to the two-dimensional graph, which has been displayed in the two-dimensional graph tag G2, are displayed and a three-dimensional graph formula tag F3 in which the three-dimensional graph formula (x2+y2+z2=1), which has been displayed in the three-dimensional graph formula tag F1, and the two-dimensional graph formula (y=x2), which has been displayed in the two-dimensional graph formula tag F2, are displayed in association with each other as illustrated in FIG. 8, instead of the three-dimensional graph tag G1, the three-dimensional graph formula tag F1, the two-dimensional graph tag G2, and the two-dimensional graph formula tag F2. That is, the three-dimensional graph tag G3 in which the three-dimensional graph tag G1 is coupled with the two-dimensional graph tag G2 and the three-dimensional graph formula tag F3 in which the three-dimensional graph formula tag F1 is coupled with the two-dimensional graph formula tag F2 are displayed in association with each other. In the coupled three-dimensional graph formula tag F3, the two-dimensional graph formula, which has been displayed in the two-dimensional graph formula tag F2, is exceptionally displayed as the two-dimensional graph formula. The operation of moving the two-dimensional graph tag G2 or the operation of moving the two-dimensional graph formula tag F2 described above is, for example, a drag and drop operation.

In the three-dimensional graph formula tag F3, a tag FT31 is a tag corresponding to the three-dimensional graph formula of "x2+y2+z2=1", and a tag FT32 is a tag corresponding to the two-dimensional graph formula of "y=x2". In the three-dimensional graph tag G3, a tag GT31 is a tag corresponding to the three-dimensional graph that corresponds to the three-dimensional graph formula of "x2+y2+z2=1", and a tag GT32 is a tag corresponding to the three-dimensional graph that corresponds to the two-dimensional graph formula of "y=x2". For example, the tag FT31 and the tag FT32 are displayed in different colors, and the tag GT31 and the tag GT32 are also displayed in different colors. However, the tag FT31 and the tag GT31 corresponding to the three-dimensional graph formula of "x2+y2+z2=1" are displayed in the same color, and the tag FT32 and the tag GT32 corresponding to the two-dimensional graph formula of "y=x2" are also displayed in the same color.

Figure 9:
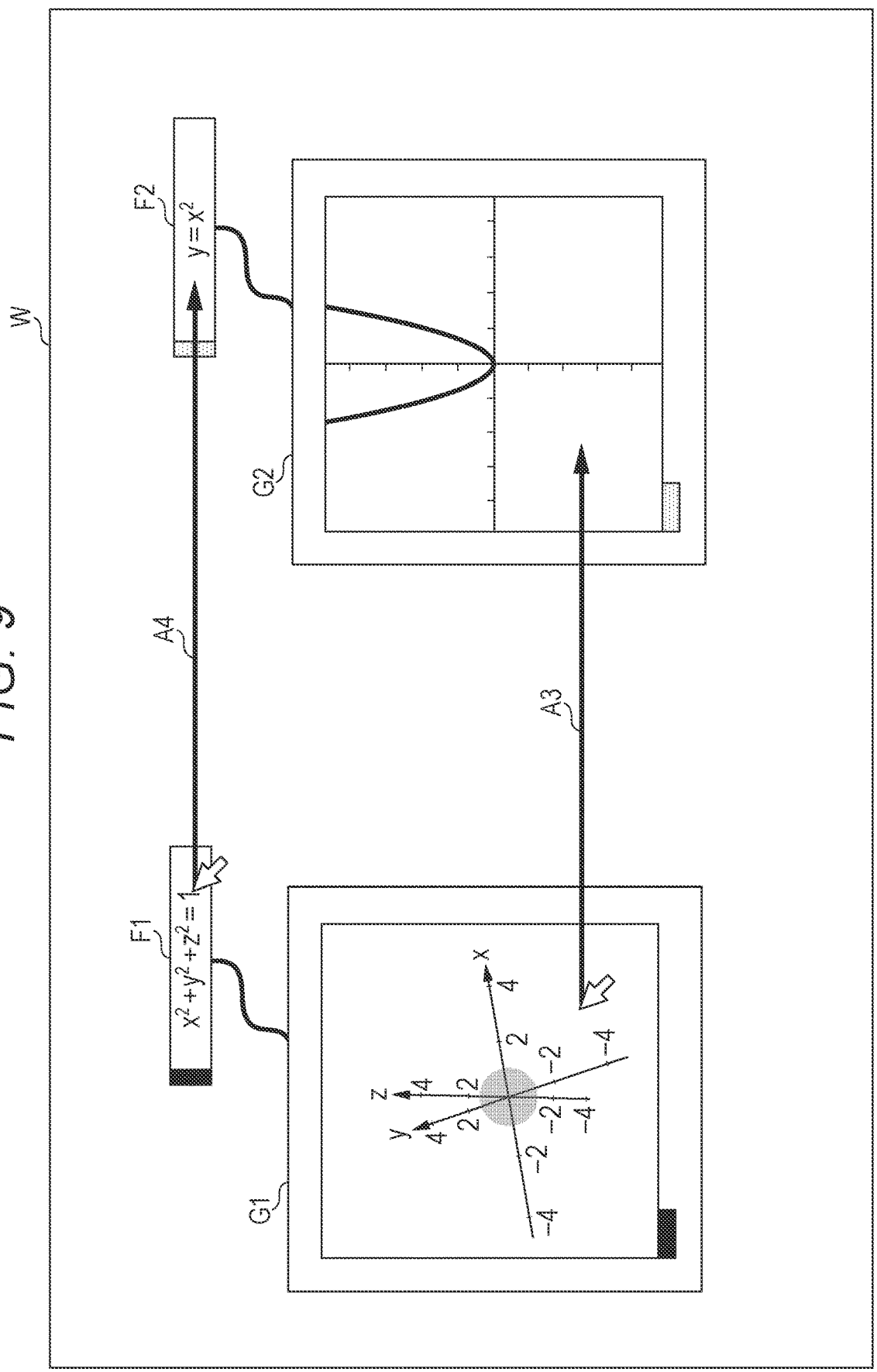
FIG. 9 is a diagram for describing another example of the procedure of coupling the tags having different dimensions.
Figure 10:
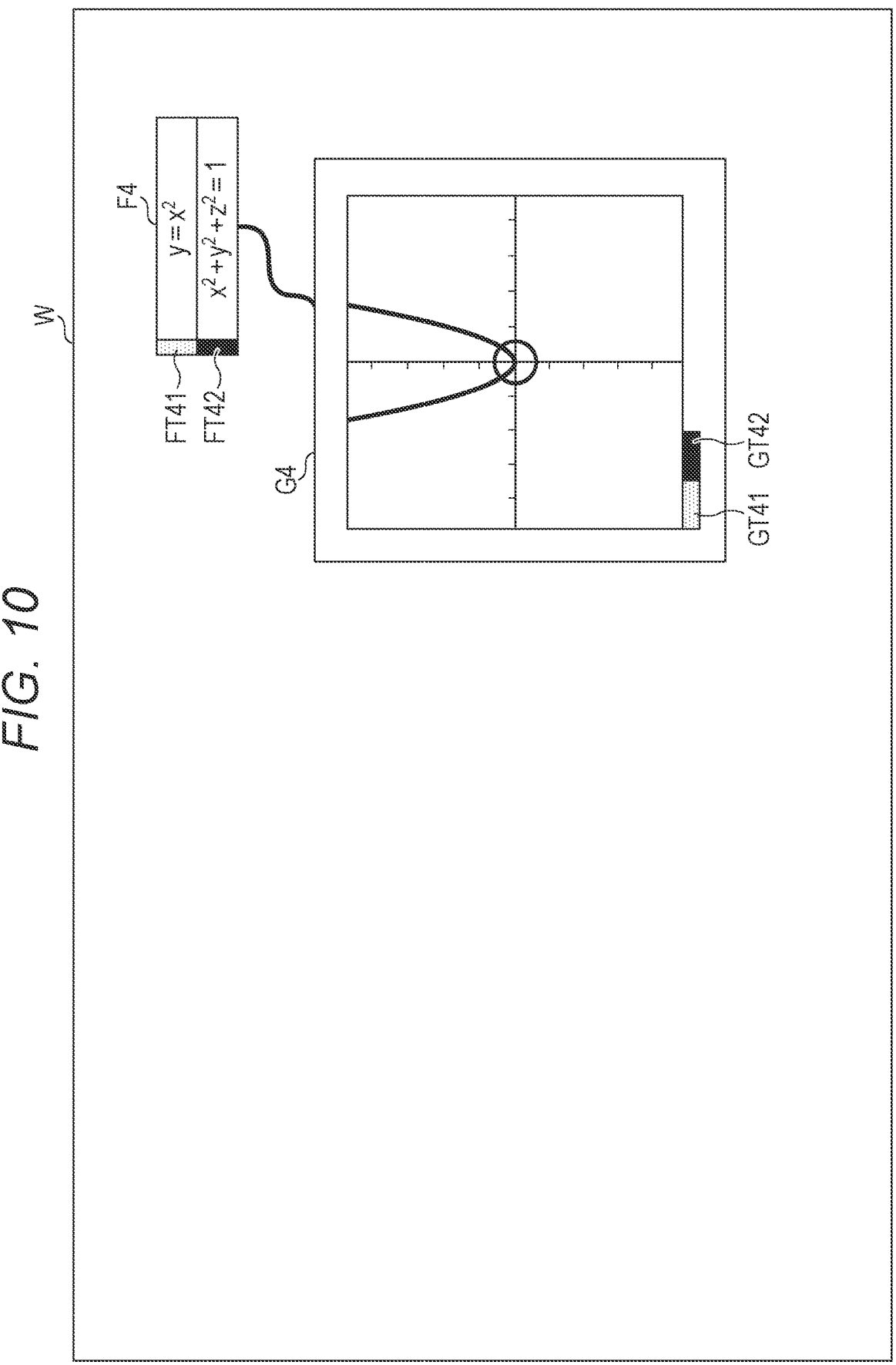
FIG. 10 is another diagram for describing the another example of the procedure of coupling the tags having different dimensions.

FIGS. 9 and 10 are diagrams for describing another example of the procedure of coupling tags having different dimensions. The another example of the procedure of coupling the tags having different dimensions displayed on the application screen of the window W illustrated in FIG. 4 will be described with reference to FIGS. 9 and 10.

When the user performs an operation of moving the three-dimensional graph tag G1 as indicated by an arrow A3 in FIG. 9 such that the three-dimensional graph tag G1 is partially or entirely superimposed on the two-dimensional graph tag G2 or an operation of moving the three-dimensional graph formula tag F1 as indicated by an arrow A4 in FIG. 9 such that the three-dimensional graph formula tag F1 is partially or entirely superimposed on the two-dimensional graph formula tag F2 in the state where the three-dimensional graph tag G1, the three-dimensional graph formula tag F1, the two-dimensional graph tag G2, and the two-dimensional graph formula tag F2 are displayed on the application screen, a two-dimensional graph tag G4 in which the two-dimensional graph (two-dimensional graph corresponding to "y=x2"), which has been displayed in the two-dimensional graph tag G2, and a two-dimensional graph (two-dimensional graph corresponding to "x2+y2+z2=1") corresponding to the three-dimensional graph, which has been displayed in the three-dimensional graph tag G1, are displayed, and a two-dimensional graph formula tag F4 in which the two-dimensional graph formula (y=x2), which has been displayed in the two-dimensional graph formula tag F2, and the three-dimensional graph formula (x2+y2+z2=1), which has been displayed in the three-dimensional graph formula tag F1, are displayed in association with each other as illustrated in FIG. 10, instead of the three-dimensional graph tag G1, the three-dimensional graph formula tag F1, the two-dimensional graph tag G2, and the two-dimensional graph formula tag F2. That is, the two-dimensional graph tag G4 in which the two-dimensional graph tag G2 is coupled with the three-dimensional graph tag G1, and the two-dimensional graph formula tag F4 in which the two-dimensional graph formula tag F2 is coupled with the three-dimensional graph formula tag F1 are displayed in association with each other. In the coupled two-dimensional graph formula tag F4, the three-dimensional graph formula, which has been displayed in the three-dimensional graph formula tag F1, is exceptionally displayed as the three-dimensional graph formula. The operation of moving the three-dimensional graph tag G1 or the operation of moving the three-dimensional graph formula tag F1 described above is, for example, a drag and drop operation.

In the two-dimensional graph formula tag F4, a tag FT41 is a tag corresponding to the two-dimensional graph formula of "y=x2", and a tag FT42 is a tag corresponding to the three-dimensional graph formula of "x2+y2+z2=1". In the two-dimensional graph tag G4, a tag GT41 is a tag corresponding to the two-dimensional graph which corresponds to the two-dimensional graph formula of "y=x2", and a tag GT42 is a tag corresponding to the two-dimensional graph which corresponds to the three-dimensional graph formula "x2+y2+z2=1". For example, the tag FT41 and the tag FT42 are displayed in different colors, and the tag GT41 and the tag GT42 are also displayed in different colors. However, the tag FT41 and the tag GT41 corresponding to the two-dimensional graph formula of "y=x2" are displayed in the same color, and the tag FT42 and the tag GT42 corresponding to the three-dimensional graph formula of "x2+y2+z2=1" are also displayed in the same color.

Figure 11:
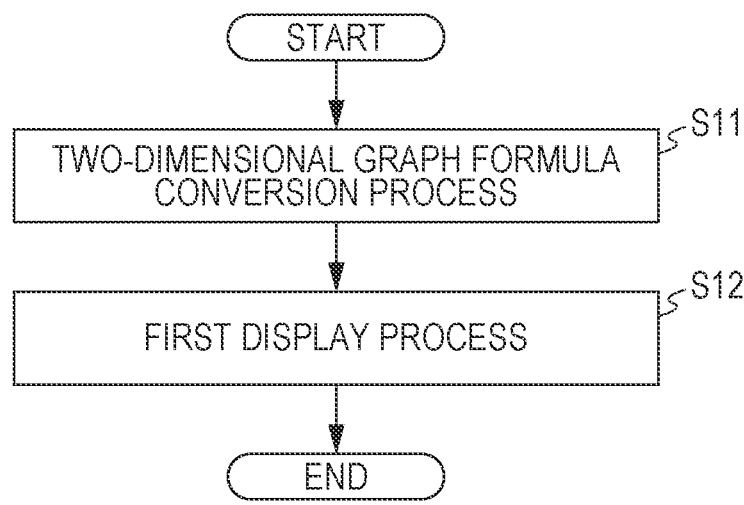
FIG. 11 is a diagram illustrating an example of a flowchart of processing performed by the system.
Figure 12:
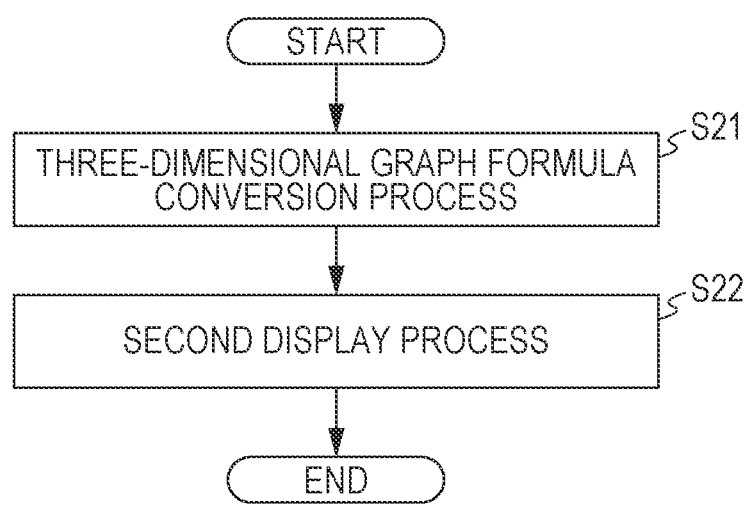
FIG. 12 is another diagram illustrating the example of the flowchart of the processing performed by the system.

FIGS. 11 and 12 are diagrams illustrating an example of a flowchart of processing performed by the system 1. An example of a specific processing procedure of a display control method related to the coupling of the tags having different dimensions performed by the system 1 will be described with reference to FIGS. 11 and 12. This display control method is an example of a graph display method. Note that a case where the processing illustrated in FIGS. 11 and 12 is performed by the client terminal 10 will hereinafter be described as an example. The processing is performed by the client terminal 10 executing the program 12a downloaded from the server 20, in cooperation with the server 20.

The processing illustrated in FIG. 11 is also processing related to the coupling of the tags having different dimensions described with reference to FIGS. 7 and 8. In this processing, in a case where a first two-dimensional graph formula tag (for example, F2) including one or more two-dimensional graph formulas, a first two-dimensional graph tag (for example, G2) including one or more two-dimensional graphs corresponding to the one or more two-dimensional graph formulas associated with the first two-dimensional graph formula tag, a first three-dimensional graph formula tag (for example, F1) including one or more three-dimensional graph formulas, and a first three-dimensional graph tag (for example, G1) including one or more three-dimensional graphs corresponding to the one or more three-dimensional graph formulas associated with the first three-dimensional graph formula tag are displayed on the display device 14, the processor 11 performs a two-dimensional graph formula conversion process of converting each of the one or more two-dimensional graph formulas included in the first two-dimensional graph formula tag into a three-dimensional graph formula with a parameter display and generating one or more three-dimensional graph formulas corresponding to the one or more two-dimensional graph formulas in response to either an operation of moving the first two-dimensional graph formula tag such that the first two-dimensional graph formula tag is partially or entirely superimposed on the first three-dimensional graph formula tag or an operation of moving the first two-dimensional graph tag such that the first two-dimensional graph tag is partially or entirely superimposed on the first three-dimensional graph tag (Step S11). That is, the processor 11 is an example of a two-dimensional graph formula conversion processing unit. In the two-dimensional graph formula conversion process, the above-described moving operation performed by the user is, for example, a drag and drop operation. In addition, the conversion from the two-dimensional graph formula into the three-dimensional graph formula with the parameter display is performed, for example, as illustrated in the following (1) to (4).

(1) When a two-dimensional graph formula is of a type "y=f(x)", the two-dimensional graph formula is converted into a three-dimensional graph formula with a parameter display of "{x(s, t)=s, y(s, t)=f(s), z(s, t)=t} (s, t: parameters)".

(2) When a two-dimensional graph formula is of a type "x=f(y)", the two-dimensional graph formula is converted into a three-dimensional graph formula with a parameter display of "{x(s, t)=f(s), y(s, t)=s, z(s, t)=t} (s, t: parameters)".

(3) When a two-dimensional graph formula is of a type "r=f(θ)", the two-dimensional graph formula is converted into a three-dimensional graph formula with a parameter display of "{x(s, t)=f(s)*cos(s), y(s, t)=f(s)*sin(s), z(s, t)=t} (s, t: parameters)".

(4) When a two-dimensional graph formula is of a type of "{x(t)=f(t), y(t)=g(t)} (t: parameter)" (the type with a parameter display), the two-dimensional graph formula is converted into a three-dimensional graph formula with a parameter display of "{x(s, t)=f(s), y(s, t)=g(s), z(s, t)=t} (s, t: parameters)".

In addition, when a two-dimensional graph formula is a partial two-dimensional graph formula of a type "f(x, y)=0" (two-dimensional graph formula corresponding to a conic section), for example, the two-dimensional graph formula is first converted into a two-dimensional graph formula with a parameter display of "{x(t)=f(t), y(t)=g(t)} (t: parameter)", and then, the resultant is converted into a three-dimensional graph formula with a parameter display of "{x(s, t)=f(s), y(s, t)=g (s), z(s, t)=t} (s, t: parameters)" as illustrated in (4) described above. In addition, when a two-dimensional graph formula is an inequality, the two-dimensional graph formula is converted into a three-dimensional graph formula of an inequality with a parameter display. For example, when the two-dimensional graph formula is a two-dimensional graph formula of an inequality of "y<f(x)", the two-dimensional graph formula is converted into a three-dimensional graph formula of an inequality with a parameter display of "{x(s, t)=s, y(s, t)<f(s), z(s, t)=t} (s, t: parameters)". In addition, when a two-dimensional graph formula is a conditional two-dimensional graph formula, the two-dimensional graph formula is converted into a conditional three-dimensional graph formula with a parameter display. For example, when the two-dimensional graph formula is a conditional two-dimensional graph formula "y=f(x), where x>0", the two-dimensional graph formula is converted into a conditional three-dimensional graph formula with a parameter display of "{x(s, t)=s, y(s, t)=f(s), z(s, t)=t} (s, t: parameters), where s>0".

When the two-dimensional graph formula conversion process is ended, the processor 11 performs a first display process of displaying a second three-dimensional graph formula tag (for example, F3) including one or more two-dimensional graph formulas included in the first two-dimensional graph formula tag and the one or more three-dimensional graph formulas included in the first three-dimensional graph formula tag, and a second three-dimensional graph tag (for example, G3) including the one or more three-dimensional graphs included in the first three-dimensional graph tag and one or more three-dimensional graphs corresponding to the one or more three-dimensional graph formulas, generated by the two-dimensional graph formula conversion process, on the display device 14 in association with each other, instead of the first two-dimensional graph formula tag, the first two-dimensional graph tag, the first three-dimensional graph formula tag, and the first three-dimensional graph tag (Step S12). That is, the processor 11 is an example of a first display processing unit. In the first display process, the three-dimensional graph corresponding to the three-dimensional graph formula generated by the two-dimensional graph formula conversion process can be drawn, for example, as follows. The three-dimensional graph can be drawn by sequentially inputting specific numerical values (where, numerical values in a range according to a condition if the condition exists) to s and t as parameters in the three-dimensional graph formula generated by the two-dimensional graph formula conversion process to obtain x-coordinates, y-coordinates, and z-coordinates, and plotting points corresponding to the coordinates. At this time, a wire frame view may be formed by connecting several points, or a plane formed by a plurality of points may be drawn as a polygon and colored. In the first display process, the three-dimensional graph included in the first three-dimensional graph tag and the three-dimensional graph corresponding to the three-dimensional graph formula generated by the two-dimensional graph formula conversion process may be displayed in different colors at the time of displaying the second three-dimensional graph tag on the display device 14.

Note that the second three-dimensional graph tag displayed by the first display process can be also referred to as a three-dimensional graph tag obtained by adding the one or more three-dimensional graphs corresponding to the one or more three-dimensional graph formulas generated by the two-dimensional graph formula conversion process to the first three-dimensional graph tag.

According to the processing illustrated in FIG. 11 described above, the user can three-dimensionally display the two-dimensional graph formula included in the two-dimensional graph formula tag by performing an intuitive operation, such as an operation of moving the two-dimensional graph formula tag so as to be superimposed on the three-dimensional graph formula tag or an operation of moving the two-dimensional graph tag so as to be superimposed on the three-dimensional graph tag. Therefore, the user can perform a three-dimensional graph display of the two-dimensional graph formula only by performing the intuitive operation such as moving the tag to be superimposed without performing an operation of converting the two-dimensional graph formula into the three-dimensional graph formula by himself/herself and inputting the three-dimensional graph formula into the three-dimensional graph formula tag, and can confirm a difference between the two-dimensional graph display and the three-dimensional graph display regarding the two-dimensional graph formula. In addition, the operation can be made more intuitive by performing the operation of moving the tag so as to be superimposed by a drag-and-drop operation. In addition, the two-dimensional graph can be displayed to be mixed with the three-dimensional graph on the three-dimensional graph tag by a simple operation such as a drag and drop operation.

Note that the processing illustrated in FIG. 11 is also processing including an example of processing in which a processor converts a mathematical formula including two variables into a three-dimensional graph formula and displays the three-dimensional graph formula on a display unit as a first three-dimensional graph. In addition, the conversion into the three-dimensional graph formula at this time is also processing including an example of a process of converting the mathematical formula including two variables into the three-dimensional graph formula using a parameter which indirectly represents a relationship between the two variables. In addition, the processing is also processing including an example of processing in which the processor displays a three-dimensional graph of a mathematical formula including three variables together with the first three-dimensional graph as a second three-dimensional graph. In addition, the display at this time is also processing including an example of a process of displaying the first three-dimensional graph and the second three-dimensional graph in different colors. Further, the processing is also processing including an example of processing in which the display unit includes a first display area displaying a two-dimensional graph of the mathematical formula including two variables and a second display area displaying the second three-dimensional graph, and the processor moves the first display area in response to an operation input to an input unit and displays the first three-dimensional graph in the second display area together with the second three-dimensional graph when the first display area is superimposed on the second display area. Further, the processing is also processing including an example of processing in which the display unit includes a first mathematical formula display area displaying the mathematical formula including two variables and a second mathematical formula display area displaying the mathematical formula including three variables, and the processor moves the first mathematical formula display area in response to an operation input to the input unit, and displays the first three-dimensional graph in the second display area together with the second three-dimensional graph when the first mathematical formula display area is superimposed on the second mathematical formula display area.

The processing illustrated in FIG. 12 is also processing related to the coupling of the tags having different dimensions described with reference to FIGS. 9 and 10. In this processing, in a case where the first two-dimensional graph formula tag (for example, F2), the first two-dimensional graph tag (for example, G2), the first three-dimensional graph formula tag (for example, F1), and the first three-dimensional graph tag (for example, G1) described above are displayed on the display device 14, the processor 11 performs a three-dimensional graph formula conversion process of converting each of the one or more three-dimensional graph formulas included in the first three-dimensional graph formula tag into a two-dimensional graph formula and generating one or more two-dimensional graph formulas corresponding to the one or more three-dimensional graph formulas in response to either an operation of moving the first three-dimensional graph formula tag such that the first three-dimensional graph formula tag is partially or entirely superimposed on the first two-dimensional graph formula tag or an operation of moving the first three-dimensional graph tag such that the first three-dimensional graph tag is partially or entirely superimposed on the first two-dimensional graph tag (Step S21). That is, the processor 11 is an example of a three-dimensional graph formula conversion processing unit. In the three-dimensional graph formula conversion process, the above-described moving operation performed by the user is, for example, a drag and drop operation. In addition, the conversion from the three-dimensional graph formula into the two-dimensional graph formula is performed, for example, with a precondition. For example, a precondition of "z=0" is provided, and the three-dimensional graph formula of "x2+y2+z2=1" is converted into a two-dimensional graph formula of "x2+y2=1", or a three-dimensional graph formula of "z=x+y" is converted into a two-dimensional graph formula of "y=−x".

When the three-dimensional graph formula conversion process is ended, the processor 11 performs a second display process of displaying a second two-dimensional graph formula tag (for example, F4) including one or more two-dimensional graph formulas included in the first two-dimensional graph formula tag and the one or more three-dimensional graph formulas included in the first three-dimensional graph formula tag, and a second two-dimensional graph tag (for example, G4) including the one or more two-dimensional graphs included in the first two-dimensional graph tag and one or more two-dimensional graphs corresponding to the one or more two-dimensional graph formulas, generated by the two-dimensional graph formula conversion process, on the display device 14 in association with each other, instead of the first two-dimensional graph formula tag, the first two-dimensional graph tag, the first three-dimensional graph formula tag, and the first three-dimensional graph tag (Step S22). That is, the processor 11 is an example of a second display processing unit.

According to the processing illustrated in FIG. 12 described above, the user can two-dimensionally display the three-dimensional graph formula included in the three-dimensional graph formula tag by performing an intuitive operation, such as an operation of moving the three-dimensional graph formula tag so as to be superimposed on the two-dimensional graph formula tag or an operation of moving the three-dimensional graph tag so as to be superimposed on the two-dimensional graph tag. Therefore, the user can perform a two-dimensional graph display of the three-dimensional graph formula only by performing the intuitive operation such as moving the tag so as to be superimposed without performing an operation of converting the three-dimensional graph formula into the two-dimensional graph formula by himself/herself and inputting the two-dimensional graph formula into the two-dimensional graph formula tag, and can confirm the difference between the two-dimensional graph display and the three-dimensional graph display regarding the three-dimensional graph formula. In addition, the operation can be made more intuitive by performing the operation of moving the tag so as to be superimposed by a drag-and-drop operation.

Note that the processing illustrated in FIG. 12 is also processing including an example of processing in which a processor converts a mathematical formula including three variables into a two-dimensional graph formula and displays the three-dimensional graph formula on a display unit as a first two-dimensional graph. In addition, the processing is also processing including an example of processing in which the processor displays a second two-dimensional graph of a mathematical formula including two variables together with the first two-dimensional graph.

The above-described embodiments illustrate specific examples in order to facilitate understanding of the invention, and the present invention is not limited to these embodiments, and should be understood as including various modifications and alternative modes of the above-described embodiments. For example, it may be understood that various embodiments can be embodied by modifying components without departing from the spirit and scope thereof. In addition, it may be understood that various embodiments can be implemented by appropriately combining a plurality of components disclosed in the above-described embodiments. In addition, a person skilled in the art may understand that various embodiments can be implemented by deleting some components from all the components illustrated in the embodiments or adding some components to the components illustrated in the embodiments. That is, a recording medium, the server device, the display control method, and the system can be variously modified and changed without departing from the scope of the claims.

In the above-described embodiments, coupled tags may be separated by the user's operation. For example, in a case where the three-dimensional graph tag G3 and the three-dimensional graph formula tag F3 illustrated in FIG. 8 are displayed, the three-dimensional graph tag G1, the three-dimensional graph formula tag F1, the two-dimensional graph tag G2, and the two-dimensional graph formula tag F2 illustrated in FIG. 4 may be displayed, instead of the three-dimensional graph tag G3 and the three-dimensional graph formula tag F3, in response to either an operation of moving the tag GT32 corresponding to the three-dimensional graph which corresponds to the two-dimensional graph formula of "y=x2" to the outside of the three-dimensional graph tag G3 or an operation of moving the tag FT32 corresponding to the two-dimensional graph formula of "y=x2" to the outside of the three-dimensional graph formula tag F3. Further, for example, in a case where the two-dimensional graph tag G4 and the two-dimensional graph formula tag F4 illustrated in FIG. 10 are displayed, the three-dimensional graph tag G1, the three-dimensional graph formula tag F1, the two-dimensional graph tag G2, and the two-dimensional graph formula tag F2 illustrated in FIG. 4 may be displayed, instead of the two-dimensional graph tag G4 and the two-dimensional graph formula tag F4, in response to either an operation of moving the tag GT42 corresponding to the two-dimensional graph which corresponds to the three-dimensional graph formula of "x2+y2+z2=1" to the outside of the two-dimensional graph tag G4 or an operation of moving the tag FT42 corresponding to the three-dimensional graph formula of "x2+y2+z2=1" to the outside of the two-dimensional graph formula tag F4. As a result, the coupled tags can be returned to states before coupling. In any case, the operation of moving the tag is, for example, a drag and drop operation.

In the processing illustrated in FIG. 11 of the above-described embodiments, the two-dimensional graph formula is converted into the three-dimensional graph formula with the parameter display to be three-dimensionally displayed, but the two-dimensional graph can be made three-dimensional without particularly using the parameter. Specifically, a two-dimensional graph may be drawn on an xy plane with z=0, and the two-dimensional graph may be drawn in a manner of sequentially copying the two-dimensional graph in both positive and negative directions of a z axis.

What is claimed is:

1. A graph display device comprising:
   a display unit;
   an operation unit; and
   at least one processor,
   wherein the at least one processor is configured to
   display, on the display unit, a two-dimensional graph formula displaying tag which displays a two-dimensional graph formula including two variables, a three-dimensional graph formula displaying tag which displays a three-dimensional graph formula including three variables, and a three-dimensional graph displaying tag which displays a first three-dimensional graph corresponding to the three-dimensional graph formula,
   move the two-dimensional graph formula displaying tag based on an operation of the operation unit under a condition where the two-dimensional graph formula displaying tag, the three-dimensional graph formula displaying tag and the three-dimensional graph displaying tag are displayed,
   upon detecting that the two-dimensional graph formula displaying tag is displayed to be superimposed on at least a part of the three-dimensional graph formula displaying tag as a result of the moving of the two-dimensional graph formula displaying tag, perform conversion of the two-dimensional graph formula displayed on the two-dimensional graph formula displaying tag to a three-dimensional graph formula corresponding to the two-dimensional graph formula, and
   display, on the three-dimensional graph displaying tag, a second three-dimensional graph corresponding to the converted three-dimensional graph formula together with the first three-dimensional graph corresponding to the three-dimensional graph formula displayed on the three-dimensional graph formula displaying tag.

2. The graph display device according to claim 1, wherein the at least one processor is configured to
   convert the two-dimensional graph formula into the three-dimensional graph formula using a parameter which indirectly represents a relationship between the two variables.

3. The graph display device according to claim 1, wherein the at least one processor is configured to
   display the first three-dimensional graph and the second three-dimensional graph in different colors.

4. The graph display device according to claim 1, wherein the at least one processor is further configured to:
   display, on the display unit, a two-dimensional graph displaying tag which displays a two-dimensional graph corresponding to the two-dimensional graph formula,
   move the two-dimensional graph displaying tag based on an operation of the operation unit,
   upon detecting that the two-dimensional graph displaying tag is displayed to be superimposed on at least a part of the three-dimensional graph displaying tag as a result of the moving of the two-dimensional graph displaying tag, perform the conversion of the two-dimensional graph formula displayed on the two-dimensional graph formula displaying tag to the three-dimensional graph formula corresponding to the two-dimensional graph formula, and
   display, on the three-dimensional graph displaying tag, the second three-dimensional graph corresponding to the converted three-dimensional graph formula together with the first three-dimensional graph corresponding to the three-dimensional graph formula displayed on the three-dimensional graph formula displaying tag.

5. The graph display device according to claim 1, wherein the at least one processor is configured to
   display, on the display unit, a two-dimensional graph displaying tag which displays a two-dimensional graph corresponding to the two-dimensional graph formula,
   move the three-dimensional graph formula displaying tag based on an operation of the operation unit, under a condition where the two-dimensional graph formula displaying tag, the three-dimensional graph formula displaying tag and the three-dimensional graph displaying tag are displayed,
   upon detecting that the three-dimensional graph formula displaying tag is displayed to be superimposed on at least a part of the two-dimensional graph formula displaying tag as a result of the moving of the three-dimensional graph formula displaying tag, perform conversion of the three-dimensional graph formula displayed on the three-dimensional graph tag to a two-dimensional graph formula corresponding to the three-dimensional graph formula, and
   display, on the two-dimensional graph displaying tag, a two-dimensional graph corresponding to the converted two-dimensional graph formula together with a two-dimensional graph corresponding to the two-dimensional graph formula displayed on the two-dimensional graph formula displaying tag.

6. The graph display device according to claim 1, wherein the at least one processor is configured to
   cause the display unit to display the three-dimensional graph formula displaying tag and the three-dimensional graph displaying in an associated state by an association line.

7. The graph display device according to claim 5, wherein the at least one processor is configured to
   cause the display unit to display the two-dimensional graph formula displaying tag and the two-dimensional graph displaying tag in an associated state by an association line.

8. A graph display method of a graph display device provided with a display unit and an operation unit, the method comprising:
   displaying, on the display unit, a two-dimensional graph formula displaying tag which displays a two-dimensional graph formula including two variables, a three-dimensional graph formula displaying tag which displays a three-dimensional graph formula including three variables, and a three-dimensional graph displaying tag which displays a first three-dimensional graph corresponding to the three-dimensional graph formula,
   moving the two-dimensional graph formula displaying tag based on an operation of the operation unit under a condition where the two-dimensional graph formula displaying tag, the three-dimensional graph formula displaying tag and the three-dimensional graph displaying tag are displayed, upon detecting that the two-dimensional graph formula displaying tag is displayed to be superimposed on at least a part of the three-dimensional graph formula displaying tag as a result of the moving of the two-dimensional graph formula displaying tag, performing conversion of the two-dimensional graph formula displayed on the two-dimensional graph formula displaying tag to a three-dimensional graph formula corresponding to the two-dimensional graph formula, and displaying, on the three-dimensional graph displaying tag, a second three-dimensional graph corresponding to the converted three-dimensional graph formula together with the first three-dimensional graph corresponding to the three-dimensional graph formula displayed on the three-dimensional graph formula displaying tag.

9. The graph display method according to claim 8, further comprising:

displaying, on the display unit, a two-dimensional graph displaying tag which displays a two-dimensional graph corresponding to the two-dimensional graph formula, moving the two-dimensional graph displaying tag based on an operation of the operation unit, upon detecting that the two-dimensional graph displaying tag is displayed to be superimposed on at least a part of the three-dimensional graph displaying tag as a result of the moving of the two-dimensional graph displaying tag, performing the conversion of the two-dimensional graph formula displayed on the two-dimensional graph formula displaying tag to the three-dimensional graph formula corresponding to the two-dimensional graph formula, and displaying, on the three-dimensional graph displaying tag, the second three-dimensional graph corresponding to the converted three-dimensional graph formula together with the first three-dimensional graph corresponding to the three-dimensional graph formula displayed on the three-dimensional graph formula displaying tag.

10. A non-transitory computer-readable recording medium storing a program executable by at least one processor of a graph display device provided with a display unit and an operation unit, the program causing the at least one processor to execute:

displaying, on the display unit, a two-dimensional graph formula displaying tag which displays a two-dimensional graph formula including two variables, a three-dimensional graph formula displaying tag which displays a three-dimensional graph formula including three variables, and a three-dimensional graph displaying tag which displays a first three-dimensional graph corresponding to the three-dimensional graph formula, moving the two-dimensional graph formula displaying tag based on an operation of the operation unit under a condition where the two-dimensional graph formula displaying tag, the three-dimensional graph formula displaying tag and the three-dimensional graph displaying tag are displayed, upon detecting that the two-dimensional graph formula displaying tag is displayed to be superimposed on at least a part of the three-dimensional graph formula displaying tag as a result of the moving of the two-dimensional graph formula displaying tag, performing conversion of the two-dimensional graph formula displayed on the two-dimensional graph formula displaying tag to a three-dimensional graph formula corresponding to the two-dimensional graph formula, and displaying, on the three-dimensional graph displaying tag, a second three-dimensional graph corresponding to the converted three-dimensional graph formula together with the first three-dimensional graph corresponding to the three-dimensional graph formula displayed on the three-dimensional graph formula displaying tag.

11. The non-transitory computer-readable recording medium according to claim 10, wherein program causes the at least one processor to further execute:

displaying, on the display unit, a two-dimensional graph displaying tag which displays a two-dimensional graph corresponding to the two-dimensional graph formula, moving the two-dimensional graph displaying tag based on an operation of the operation unit, upon detecting that the two-dimensional graph displaying tag is displayed to be superimposed on at least a part of the three-dimensional graph displaying tag as a result of the moving of the two-dimensional graph displaying tag, performing the conversion of the two-dimensional graph formula displayed on the two-dimensional graph formula displaying tag to the three-dimensional graph formula corresponding to the two-dimensional graph formula, and displaying, on the three-dimensional graph displaying tag, the second three-dimensional graph corresponding to the converted three-dimensional graph formula together with the first three-dimensional graph corresponding to the three-dimensional graph formula displayed on the three-dimensional graph formula displaying tag.

* * * * *